United States Patent
Alvarez Icaza Rivera et al.

(10) Patent No.: US 10,785,745 B2
(45) Date of Patent: *Sep. 22, 2020

(54) SCALING MULTI-CORE NEUROSYNAPTIC NETWORKS ACROSS CHIP BOUNDARIES

(71) Applicant: International Business Machines Corporation, Armonk, NY (US)

(72) Inventors: Rodrigo Alvarez Icaza Rivera, San Jose, CA (US); John V. Arthur, Mountain View, CA (US); Andrew S. Cassidy, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/847,530

(22) Filed: Dec. 19, 2017

(65) Prior Publication Data

US 2018/0103448 A1    Apr. 12, 2018

Related U.S. Application Data

(63) Continuation of application No. 14/050,072, filed on Oct. 9, 2013, now Pat. No. 9,924,490.

(51) Int. Cl.
*H04W 68/00* (2009.01)
*H04W 64/00* (2009.01)
(Continued)

(52) U.S. Cl.
CPC ............ *H04W 68/00* (2013.01); *G06N 3/049* (2013.01); *G06N 3/063* (2013.01); *H04W 64/00* (2013.01)

(58) Field of Classification Search
USPC .......................................................... 706/25
See application file for complete search history.

(56) References Cited

U.S. PATENT DOCUMENTS 7,209,659 B2    4/2007 Munter
8,473,439 B2    6/2013 Arthur et al.
(Continued)

FOREIGN PATENT DOCUMENTS

JP    2010-225134 A    10/2010
WO   2007/123520 A1   11/2007

OTHER PUBLICATIONS

Iman et al., "A Digital Neurosynaptic Core Using Event-Driven QDI Circuits" IEEE 2012.*
(Continued)

*Primary Examiner* — Michael B Holmes
(74) *Attorney, Agent, or Firm* — Sherman IP LLP; Kenneth L. Sherman; Steven Laut

(57) ABSTRACT

Embodiments of the invention provide a system for scaling multi-core neurosynaptic networks. The system comprises multiple network circuits. Each network circuit comprises a plurality of neurosynaptic core circuits. Each core circuit comprises multiple electronic neurons interconnected with multiple electronic axons via a plurality of electronic synapse devices. An interconnect fabric couples the network circuits. Each network circuit has at least one network interface. Each network interface for each network circuit enables data exchange between the network circuit and another network circuit by tagging each data packet from the network circuit with corresponding routing information.

18 Claims, 17 Drawing Sheets

(51) Int. Cl.
*G06N 3/04* (2006.01)
*G06N 3/063* (2006.01)

(56) References Cited

U.S. PATENT DOCUMENTS

| | | | |
|---|---|---|---|
| 8,515,885 | B2 | 8/2013 | Modha |
| 8,812,415 | B2 | 8/2014 | Modha |
| 9,924,490 | B2 * | 3/2018 | Alvarez Icaza Rivera ............... G06N 3/049 |
| 10,318,862 | B2 * | 6/2019 | Appuswamy ........... G06N 3/063 |
| 10,331,998 | B2 * | 6/2019 | Arthur .................. G06N 3/049 |
| 10,338,629 | B2 * | 7/2019 | Amir ..................... G06N 3/04 |
| 10,354,183 | B2 * | 7/2019 | Alpert ................... G06F 1/3243 |
| 10,410,109 | B2 * | 9/2019 | Akopyan ............... G06N 3/04 |
| 10,452,540 | B2 * | 10/2019 | Akopyan .............. G11C 7/1057 |
| 10,454,759 | B2 * | 10/2019 | Alvarez-Icaza Rivera ............... G06F 11/00 |
| 10,528,843 | B2 * | 1/2020 | Andreopoulos ..... G06K 9/4671 |
| 10,552,740 | B2 * | 2/2020 | Alpert ..................... G06N 3/10 |
| 10,558,892 | B2 * | 2/2020 | Andreopoulos ..... G06K 9/4661 |
| 10,621,489 | B2 * | 4/2020 | Appuswamy ........... G06F 17/16 |
| 10,635,969 | B2 * | 4/2020 | Amir ..................... G06N 3/049 |
| 10,650,301 | B2 * | 5/2020 | Alvarez-Icaza Rivera ............... G06N 3/04 |
| 2004/0095907 | A1 | 5/2004 | Agee et al. |
| 2010/0217955 | A1 | 8/2010 | Conte et al. |
| 2011/0173415 | A1 | 7/2011 | Tanabe et al. |

OTHER PUBLICATIONS

Voellmy, A., et al., "Scaling Software-Defined Network Controllers on Multicore Servers", Department of Computer Science, Jul. 2012, pp. 1-19, Yale University, New Haven, CT.

Kumar, R., et al., "Interconnections in Multi-core Architectures: Understanding Mechanisms, Overheads and Scaling", 32nd Annual International Symposium on Computer Architecture, Jun. 2005, pp. 408-419, IEEE Computer Society, USA.

Deri, L., et al., "Exploiting Commodity Multi-core Systems for Network Traffic Analysis", 2010, pp. 1-11, download available at http://svn.ntop.org/MulticorePacketCapture.pdf, USA.

Imam, N., et al., "Address-Event Communication Using Token-Ring Mutual Exclusion," Proceedings of the 2011 17th IEEE International Symposium on Asynchronous Circuits and Systems, Apr. 2011, pp. 99-108, IEEE Computer Society, USA.

Dally, W., et al., "Route packets, not wires: on-chip interconnection networks," Design Automation Conference, Jun. 2001, pp. 1-6, ACM, USA.

Moradi, S. et al., "A Memory-Efficient Routing Method for Large-Scale Spiking Neural Networks", Circuit Theory and Design (ECCTD), 2013 European Conference on, Sep. 8-12, 2013, pp. 1-4, United States.

Imam, N., et al., "A Digital Neurosynaptic Core Using Event-Driven QDI Circuits", Asynchronous Circuits and Systems (ASYNC), 2012 18th IEEE International Symposium on, May 7-9, 2012, pp. 25-32, IEEE, United States.

Plana, L.A., et al., "A GALS Infrastructure for a Massively Parallel Multiprocessor", IEEE Design & Test of Computers, Oct. 8, 2007, pp. 454-463, vol. 24, Issue:5, IEEE CS & IEEE CASS.

Serrano-Gotarredona, R. et al., "AER Building Blocks for Multi-Layer Multi-Chip Neuromorphic Vision Systems", Advances in Neural Information Processing Systems 18, 2005, p. 1-8, United States.

Liu, S-C., "Orientation-Selective aVLSI Spiking Neurons", In Advances in Neural Information Processing Systems, Sep. 14, 2002, pp. 1-8, United States.

Merolla, P., et al., "A digital neurosynaptic core using embedded crossbar memory with 45nm", 2011 IEEE Custom Integrated Circuits Conference (CICC), 2011, pp. 1-4, IEEE Conference Publications, United States.

\* cited by examiner

400

| ΔX | ΔY | A | T | D |

410

| ΔY | A | T | D | ns
SCALING MULTI-CORE NEUROSYNAPTIC NETWORKS ACROSS CHIP BOUNDARIES

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, scaling multi-core neurosynaptic networks across chip boundaries.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment provides a system for scaling multi-core neurosynaptic networks. The system comprises multiple network circuits. Each network circuit comprises a plurality of neurosynaptic core circuits. Each core circuit comprises multiple electronic neurons interconnected with multiple electronic axons via a plurality of electronic synapse devices. An interconnect fabric couples the network circuits. Each network circuit has at least one network interface. Each network interface for each network circuit enables data exchange between the network circuit and another network circuit by tagging each data packet from the network circuit with corresponding routing information.

Another embodiment provides a method for scaling multi-core neurosynaptic networks. The method comprises tagging data packets from multiple network circuits with routing information, and exchanging data packets between the network circuits via an interconnect fabric coupling the network circuits. Each network circuit comprises a plurality of neurosynaptic core circuits. Each core circuit comprises multiple electronic neurons interconnected with multiple electronic axons via a plurality of electronic synapse devices. Each network circuit has at least one network interface that enables data exchange between the network circuit and another network circuit by tagging each data packet from the network circuit with corresponding routing information.

These and other features, aspects and advantages of the present invention will become understood with reference to the following description, appended claims and accompanying figures.

DETAILED DESCRIPTION

Figure 1:
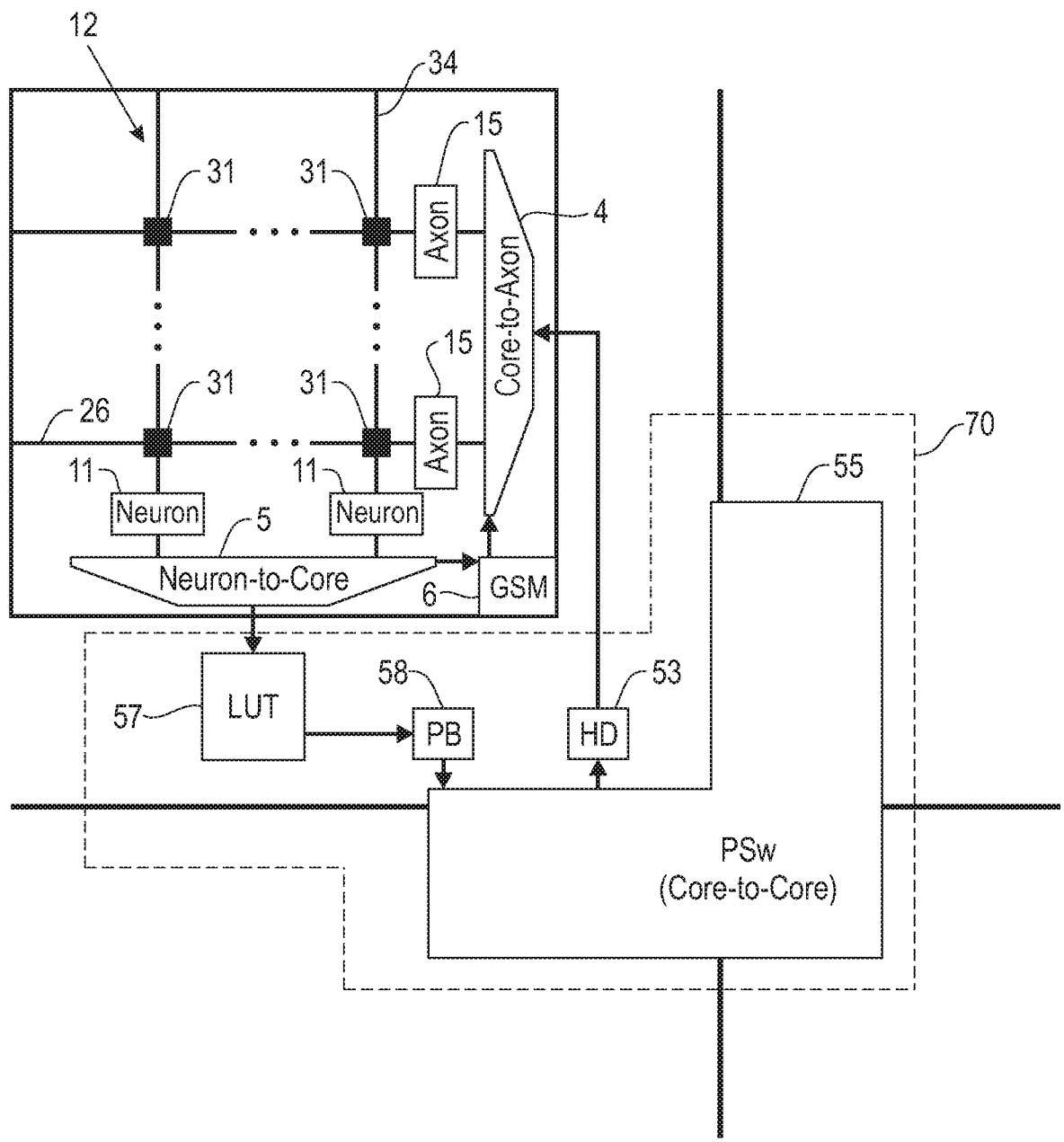
FIG. 1 illustrates an example neurosynaptic core circuit ("core circuit"), in accordance with an embodiment of the invention.

Embodiments of the invention relate to neuromorphic and synaptronic computation, and in particular, scaling multi-core neurosynaptic networks across chip boundaries. In one embodiment, a multi-core neurosynaptic network is a system on a chip comprising multiple interconnected neurosynaptic core circuits. Embodiments of the invention provide a network interface at a chip boundary of a neurosynaptic network for enabling data exchange between the neurosynaptic network and another neurosynaptic network. Enabling data exchange between neurosynaptic networks allows for the implementation of a scalable neurosynaptic system comprising multiple interconnected neurosynaptic networks.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

FIG. 1 illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "x" represents multiplication, and m and n are positive integers.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends firing events to the connected axon path 26. Each neuron 11 is connected to a dendrite path 34, and receives firing events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the firing events received, each neuron 11 generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped firing event to the address-event receiver 4.

In one example implementation, the core circuit 10 may comprise 256 neurons 11. The crossbar 12 may be a 256×256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events (e.g., Address-Event Representation (AER)). Firing event (i.e., spike event) arrival times included in address events may be deterministic or non-deterministic.

Although certain illustrative embodiments of the invention are described herein using synapses comprising electronic circuits, the present invention is not limited to electronic circuits.

Figure 2:
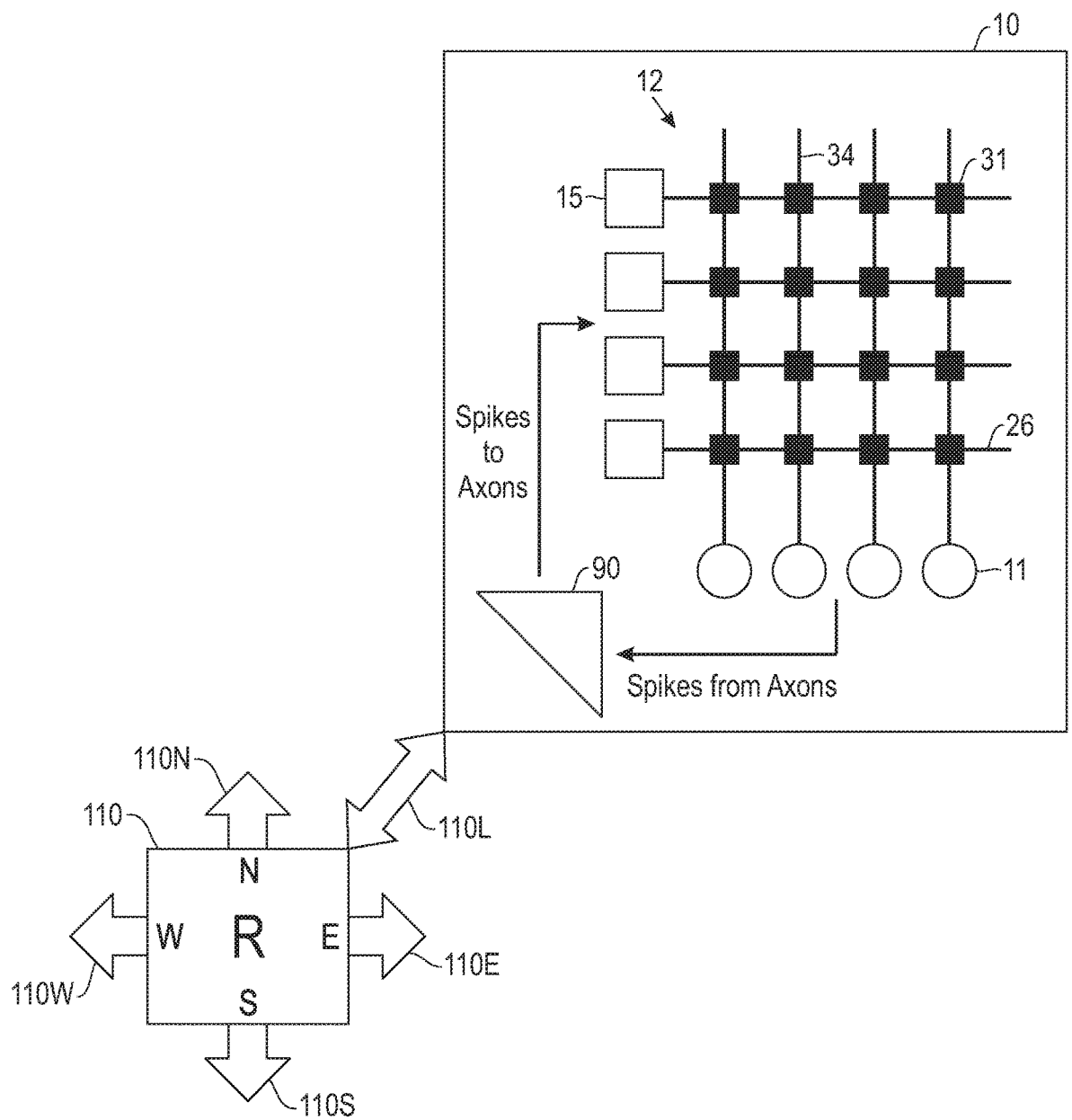
FIG. 2 illustrates an example core circuit interconnected with a corresponding packet router, in accordance with an embodiment of the invention.

FIG. 2 illustrates an example core circuit 10 interconnected with a corresponding packet router 110, in accordance with an embodiment of the invention. In one embodiment, the LUT 57, the PB 58 and the HD 53 for the core circuit 10 may be implemented as a spike interface module 90 shown in FIG. 2. The spike interface module 90 is configured to receive incoming address-event packets, wherein each incoming address-event packet includes an incoming firing event encoded as an address (e.g., an address represented as bits) representing a target axon 15. The spike interface module 90 decodes each incoming address-event packet received, and transmits an incoming firing event included in the incoming address-event packet to a target axon 15. The spike interface module 90 is further configured to receive outgoing firing events generated by the neurons 11 in the core circuit 10. The spike interface module 90 encodes/encapsulates each outgoing firing event generated as an outgoing address-event packet having the address of a target incoming axon 15, and sends/routes the outgoing address-event packet to a core circuit 10 (e.g., the same core circuit 10 or a different core circuit 10) containing the target incoming axon 15.

In one embodiment, a corresponding core-to-core packet switch (PSw) 55 for the core circuit 10 may be implemented as the packet router 110 shown in FIG. 2. In one embodiment, each core circuit 10 receives address-event packets from other core circuits 10 via a corresponding packet router 110, and sends address-event packets to other core circuits 10 via the corresponding packet router 110. Specifically, the packet router 110 has a northbound channel 110N, a southbound channel 110S, an eastbound channel 110E, and a westbound channel 110W for passing along packets to neighboring components in the northbound, southbound, eastbound, and westbound directions, respectively. The packet router 110 also has a local channel 110L for receiving packets generated by the corresponding core circuit 10, and sending packets targeting the corresponding core circuit 10.

As shown in FIG. 2, the local channel 110L interconnects the packet router 110 with the core circuit 10. The packet router 110 receives packets generated by the corresponding core circuit 10 via the local channel 110L, and sends packets targeting the corresponding core circuit 10 via the local channel 110L.

The northbound channel 110N interconnects the packet router 110 with an adjacent neighboring packet router 110 to the north of the packet router 110 ("north neighboring router"). The packet router 110 receives packets from the north neighboring packet router 110 via the northbound channel 110N, and sends packets to the north neighboring packet router 110 via the northbound channel 110N.

The southbound channel 110S interconnects the packet router 110 with an adjacent neighboring packet router 110 to the south of the packet router 110 ("south neighboring router"). The packet router 110 receives packets from the south neighboring packet router 110 via the southbound channel 110S, and sends packets to the south neighboring packet router 110 via the southbound channel 110S.

The eastbound channel 110E interconnects the packet router 110 with an adjacent neighboring packet router 110 to the east of the packet router 110 ("east neighboring router"). The packet router 110 receives packets from the east neighboring packet router 110 via the eastbound channel 110E, and sends packets to the east neighboring packet router 110 via the eastbound channel 110E.

The westbound channel 110W interconnects the packet router 110 with an adjacent neighboring packet router 110 to the west of the packet router 110 ("west neighboring router"). The packet router 110 receives packets from the west neighboring packet router 110 via the westbound channel 110W, and sends packets to the west neighboring packet router 110 via the westbound channel 110W.

Figure 3:
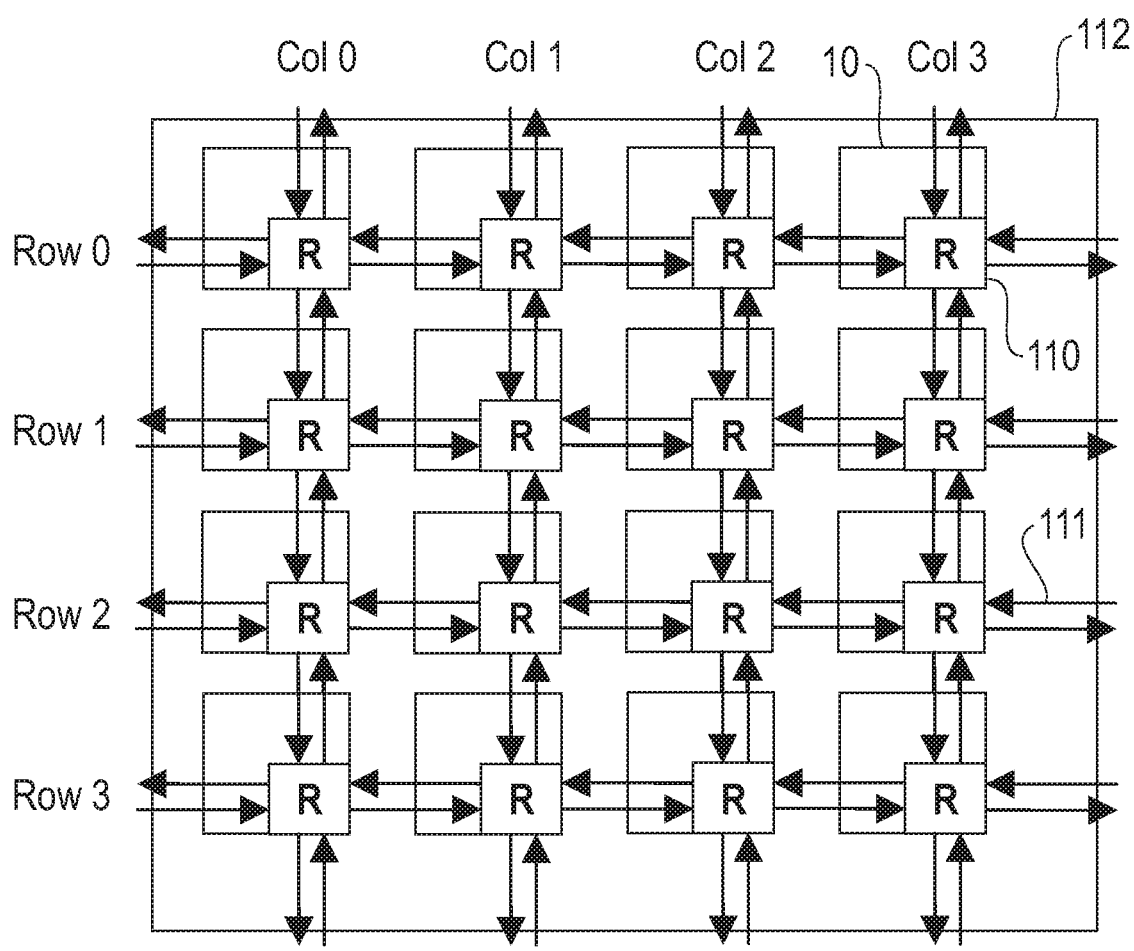
FIG. 3 illustrates an example neurosynaptic chip circuit ("chip circuit"), in accordance with an embodiment of the invention.

FIG. 3 illustrates an example neurosynaptic chip circuit ("chip circuit") 100, in accordance with an embodiment of the invention. The chip circuit 100 is a neurosynaptic network circuit comprising multiple interconnected core circuits 10. The chip circuit 100 is an example multi-core neurosynaptic network. In one embodiment, the core circuits 10 are arranged in a two-dimensional array 112. Each core circuit 10 may be identified by its Cartesian coordinates as core circuit (i, j), where i is a column index and j is a row index of the array 112 (i.e., core circuit (0,0), core circuit (0,1), . . . , (core 5,7)).

Each core circuit 10 has a corresponding packet router 110. The packet routers 110 of the chip circuit 100 are interconnected via multiple data paths (e.g., signal lines) 111. The packet routers 110 facilitate inter-core communication. Specifically, each core circuit 10 utilizes a corresponding packet router 110 to pass along address-event packets in the eastbound, westbound, northbound, or southbound direction.

As shown in FIG. 3, a packet router 110 may be interconnected to four different packet routers 110. For example, a northbound channel 110N, southbound channel 110S, an eastbound channel 110E, and a westbound channel 110W of a packet router 110 for the core circuit (2,2) may be interconnected to a southbound channel 110S of a packet router 110 for the core circuit (1,2), a northbound channel 110N of a packet router 110 for the core circuit (3,2), a westbound channel 110W of a packet router 110 for the core circuit (2,3), and an eastbound channel 110E of a packet router 110 for the core circuit (2,1), respectively.

In one embodiment, the routing of address-event packets between the core circuits 10 of the chip circuit 100 may follow dimension order routing (for example, route east-west first, then route north-south). For example, a neuron 11 of the core circuit (0,0) may generate a firing event targeting an axon 15 of the core circuit (3,3). To reach the core circuit (3,3), an address event packet including the firing event propagates from the packet router 110 for the core circuit (0,0) to the packet router 110 for the core circuit (3,3) via the packet routers 110 for the cores circuits (0,0), (0,1), (0,2) and (0,3) in the eastbound direction and the packet routers 110 for the core circuits (1,3) and (2,3) in the southbound direction.

Figures 4, 5, 6:
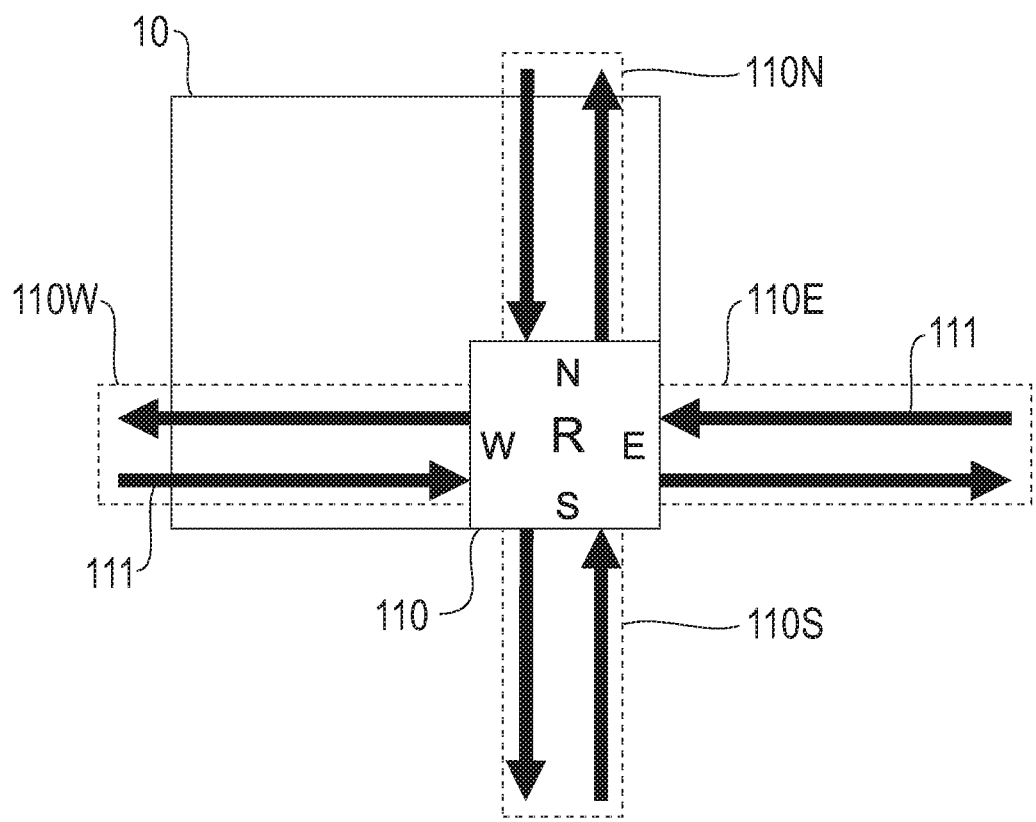
FIG. 4 illustrates an example configuration for a packet router in FIG. 2, in accordance with an embodiment of the invention.
FIG. 5 illustrates an example address event packet routed east-west between packet routers of a chip circuit 100, in accordance with an embodiment of the invention.
FIG. 6 illustrates an example address event packet routed north-south between packet routers of a chip circuit, in accordance with an embodiment of the invention.

FIG. 4 illustrates an example configuration for a packet router 110 in FIG. 2, in accordance with an embodiment of the invention. Relative to a packet router 110, each data path 111 is either an incoming data path 111 or an outgoing data path 111. A packet router 110 receives packets from a neighboring component via at least one incoming data path 111, and sends packets to a neighboring component via at least one outgoing data path 111. Each incoming data path 111 has a reciprocal outgoing data path 111. In one embodiment, an incoming data path 111 may have a buffer for maintaining incoming packets. For example, the incoming packets may be maintained in the buffer in a First In, First Out (FIFO) fashion.

As stated above, each packet router 110 has a northbound channel 110N, a southbound channel 110S, an eastbound channel 110E, and a westbound channel 110W for passing along packets to neighboring components in the northbound, southbound, eastbound, and westbound directions, respectively. Each packet router 110 also has a local channel 110L (not shown in FIG. 4 for clarity) for receiving packets generated by a corresponding core circuit 10, and sending packets targeting the corresponding core circuit 10.

Each channel 110L, 110N, 110S, 110E and 110W comprises at least one incoming data path 111 and at least one reciprocal outgoing data path 111. The packet router 110 receives packets generated by the corresponding core circuit 10 via at least one incoming data path 111 of the local channel 110L, and sends packets targeting the corresponding core circuit 10 via at least one outgoing data path 111 of the local channel 110L. The packet router 110 receives packets from the north neighboring packet router 110 via at least one incoming data path 111 of the northbound channel 110N, and sends packets to the north neighboring packet router 110 via at least one outgoing data path 111 of the northbound channel 110N. The packet router 110 receives packets from the south neighboring packet router 110 via at least one incoming data path 111 of the southbound channel 110S, and sends packets to the south neighboring packet router 100 via at least one outgoing data path 111 of the southbound channel 110S. The packet router 110 receives packets from the east neighboring packet router 110 via at least one incoming data path 111 of the eastbound channel 110E, and sends packets to the east neighboring packet router 110 via at least one outgoing data path 111 of the eastbound channel 110E. The packet router 110 receives packets from the west neighboring packet router 110 via at least one incoming data path 111 of the westbound channel 110W, and sends packets to the west neighboring packet router 110 via at least one outgoing data path 111 of the westbound channel 110W.

FIG. 5 illustrates an example address event packet 400 routed east-west between packet routers 110 of a chip circuit 100, in accordance with an embodiment of the invention. The address event packet 400 comprises a horizontal distance field $\Delta X$, a vertical distance field $\Delta Y$, a target axon A field, a delivery time T field, and a debug D field. In one embodiment, the horizontal distance field $\Delta X$ maintains 9 bits of data, the vertical distance field $\Delta Y$ maintains 9 bits of data, the target axon A field maintains 8 bit of data, the delivery time T field maintains 4 bits of data, and the debug D field maintains 2 bits of data.

The horizontal distance field $\Delta X$ represents the number of eastbound/westbound core circuits 10 the packet 400 should traverse to reach a target core circuit 10. The range of possible values for the horizontal distance field $\Delta X$ includes positive and negative integers (e.g., −256 to 255), wherein a negative integer represents the number of westbound core circuits 10 to transverse (i.e., left traverse), and a positive integer represents the number of eastbound core circuits 10 to transverse (i.e., right transverse).

The vertical distance field $\Delta Y$ represents the number of northbound/southbound core circuits 10 the packet 400 should traverse to reach a target core circuit 10. The range of possible values for the vertical distance field $\Delta Y$ includes positive and negative integers (e.g., −256 to 255), wherein a negative integer represents the number of northbound core circuits 10 to transverse (i.e., up traverse), and a positive integer represents the number of southbound core circuits 10 to transverse (i.e., down transverse).

The target axon A field identifies a target axon 15 of the target core circuit 10 that the packet should be delivered to. For example, if the target core circuit 10 comprises a 256×256 crossbar 12, the range of possible values for the target axon A field is 0 to 255.

The delivery time T field identifies a delivery time for the packet. For example, the range of possible values for the delivery time T field may be 0 to 15, wherein each value corresponds to a delivery time based on a local timescale of the target core circuit 10. A packet transmitted at time 3 with a corresponding delivery delay equal to 5 will have a corresponding delivery time T equal to 8.

The debug D field indicates a debug mode. For example, the range of possible values for the D field is 0 to 3, wherein each value represents a debug mode.

FIG. 6 illustrates an example address event packet 410 routed north-south between packet routers 110 of a chip circuit 100, in accordance with an embodiment of the invention. After an address-event packet 400 has been routed east-west, the $\Delta X$ field is dropped from the packet 400 to form the packet 410.

Figure 7:
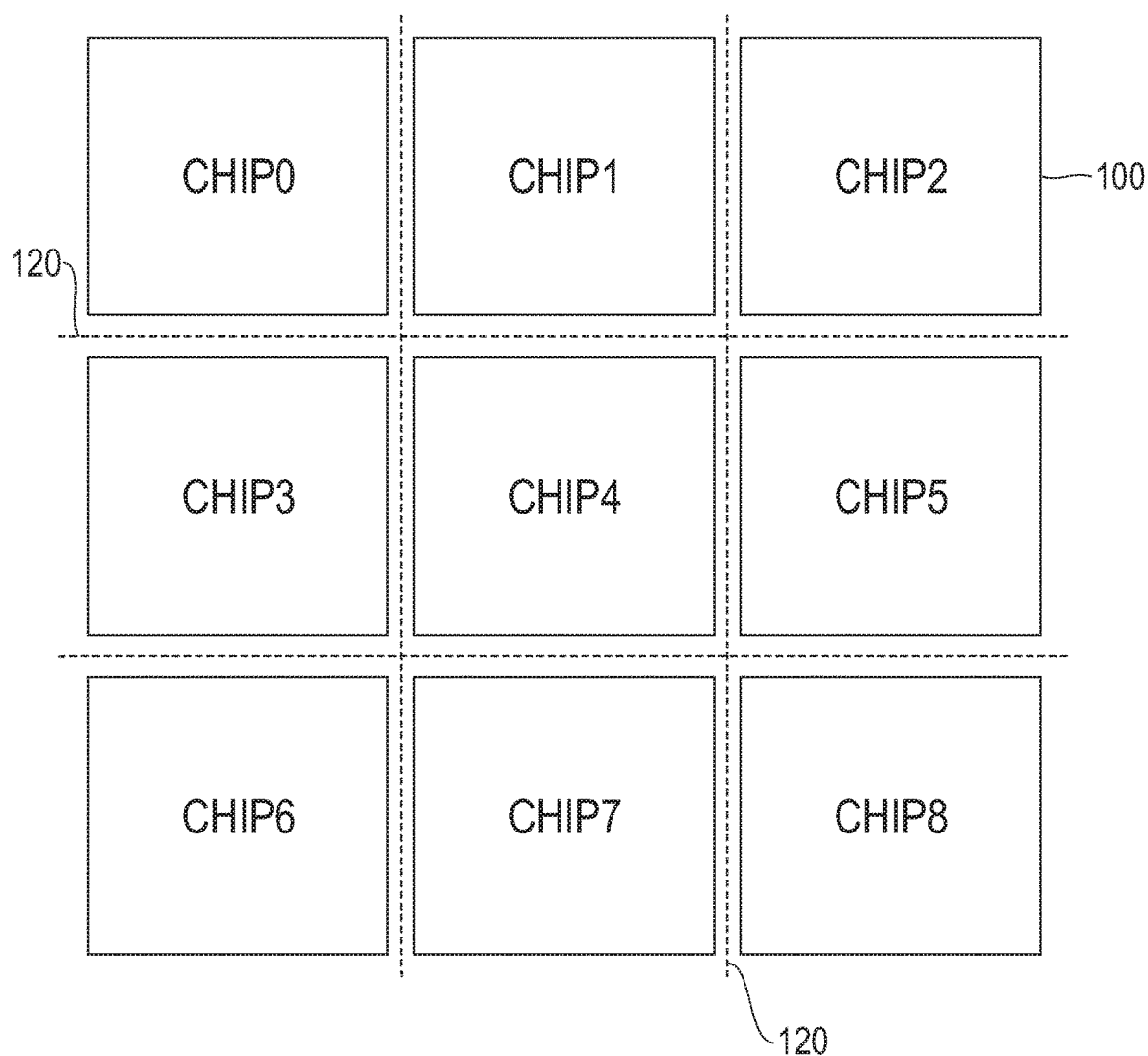
FIG. 7 illustrates an example on-board neural network system, in accordance with an embodiment of the invention.

FIG. 7 illustrates an example on-board neural network system 115, in accordance with an embodiment of the invention. The system 115 is a scalable neurosynaptic system comprises multiple chip circuits 100, such as chip circuits CHIP0, CHIP1, . . . , CHIP8.

In one embodiment, a network interface 140 including at least one funnel device 150 and at least one serialize and de-serialize device 160 (FIG. 8) is utilized at a peripheral/boundary interface (i.e., chip boundary) 120 of each chip circuit 100 to link the chip circuit 100 with one or more other chip circuits 100. As described in detail later herein, a funnel device 150 merges outgoing data (i.e., off-chip communications) from a chip circuit 100. A serialize and de-serialize device 160 serializes outgoing data from a chip circuit 100, and de-serializes incoming data for the chip circuit 100 from other chip circuits 100.

Figure 8:
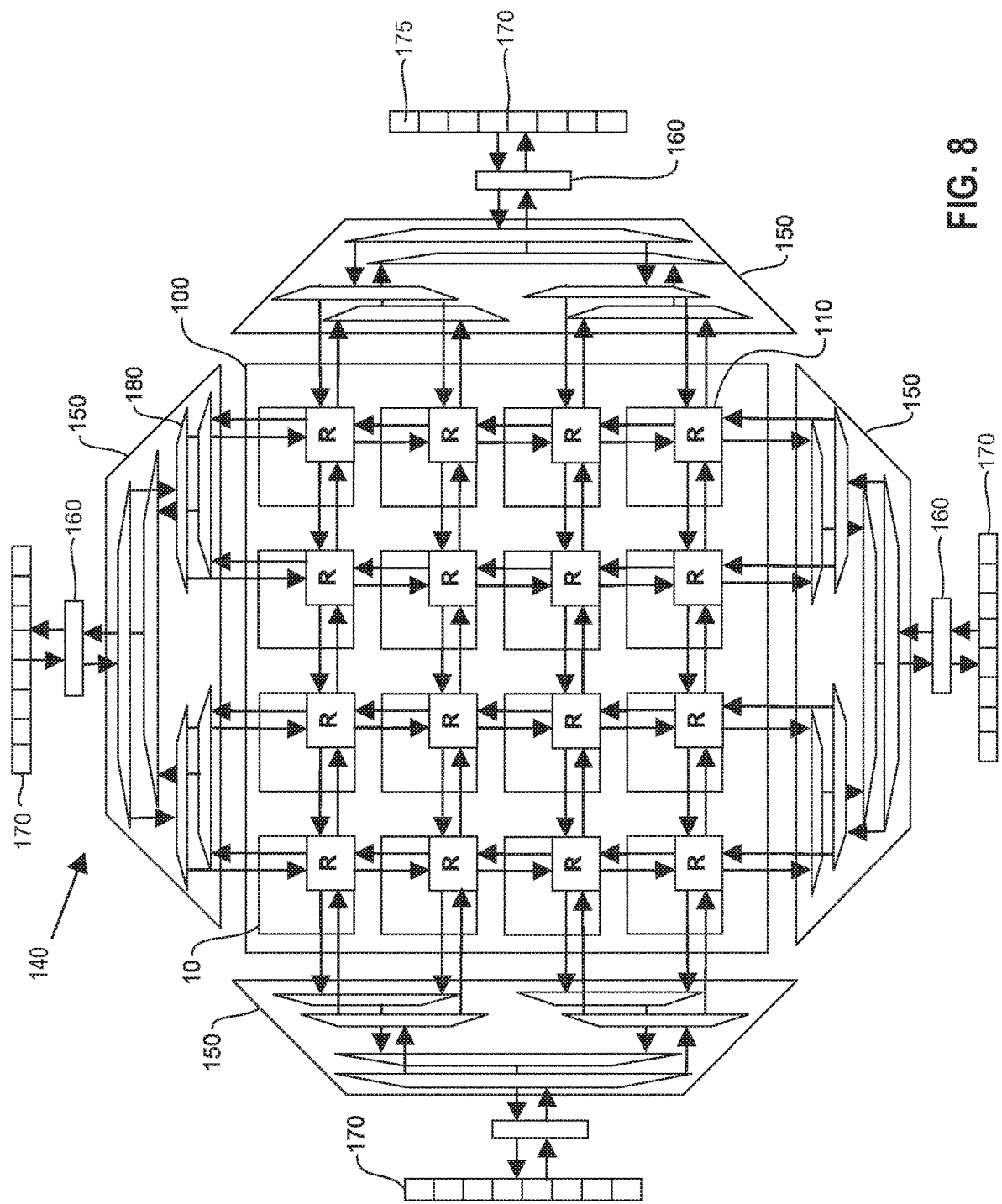
FIG. 8 illustrates an example chip circuit with an example network interface including at least one funnel device and at least one serialize and de-serialize device.

FIG. 8 illustrates an example chip circuit 100 with an example network interface 140 including at least one funnel device 150 and at least one serialize and de-serialize device 160, in accordance with an embodiment of the invention. In one embodiment, the chip circuit 100 has a set 170 of I/O pads 175 at each boundary 120 of the chip circuit 100. For example, the chip circuit may have a first set 170 at a northbound boundary 120, a second set 170 at a southbound boundary 120, a third set 170 at an eastbound boundary 120, and a fourth set 170 at a westbound boundary 120. As the number of I/O pads 175 may be limited, serialization/de-serialization is required at the boundaries 120 of the chip circuit 100 to facilitate off-chip communications.

The chip circuit 100 further comprises at least one funnel device 150. Each funnel device 150 comprises multiple funnel units 180 for merging outgoing data. For example, as shown in FIG. 8, the chip circuit 100 has a first funnel device 150 for merging outgoing data in the eastbound direction, a second funnel device 150 for merging outgoing data in the westbound direction, a third funnel device 150 for merging outgoing data in the northbound direction, and a fourth funnel device 150 for merging outgoing data in the southbound direction.

Each funnel unit 180 is configured to tag each outgoing packet from the chip circuit 100 with tag information identifying the location of a source core circuit 10 that generated the outgoing packet (e.g., the row/column of the source core circuit 10 on the chip circuit 100).

Each funnel device 150 has a corresponding serialize and de-serialize device 160. Each tagged outgoing packet is sent to a serialize and de-serialize device 160 for data serialization before being routed to an input/output (I/O) pad 175 of the chip circuit 100 for delivery to another chip circuit 100.

As shown in FIG. 8, the chip circuit 100 has a first serialize and de-serialize device 160 for serializing outgoing data in the eastbound direction and de-serializing incoming data from the eastbound direction, a second serialize and de-serialize device 160 for serializing outgoing data in the westbound direction and de-serializing incoming data from the westbound direction, a third serialize and de-serialize device 160 for serializing outgoing data in the northbound direction and de-serializing incoming data from the northbound direction, and a fourth serialize and de-serialize device 160 for serializing outgoing data in the southbound direction and de-serializing incoming data from the southbound direction.

Incoming data from the I/O pads 175 of the chip circuit 100 are routed to a serialize and de-serialize device 160. After deserialization, each incoming packet is sent to a corresponding funnel device 150 where tag information identifying a location of a core circuit 10 on the chip circuit 100 that the incoming packet targets (e.g., the row/column of the target core circuit 10 on the chip circuit 100) is removed. The funnel device 150 routes each incoming packet to a target core circuit 10 on the chip circuit 100 based on tag information for the incoming packet.

In one embodiment, the chip circuit 100 includes 65 incoming data paths 111 and 65 reciprocal outgoing data paths 111 for east-west routing. Address-event packets routed east-west are encoded as 16 1 in4 groups with a shared enable. The chip circuit 100 further includes 49 incoming data paths 111 and 49 reciprocal outgoing data paths 111 for north-south routing. Address-event packets routed north-south are encoded as 12 1 in4 groups with a shared enable.

As described in detail later herein, the funnel units 180 of each funnel device 150 may be arranged in different configurations, such as binary tree, a binary chain, or a combination of a binary tree and a binary chain. In FIG. 8, the funnels units 180 of each funnel device 150 are arranged in a binary tree.

Figure 9:
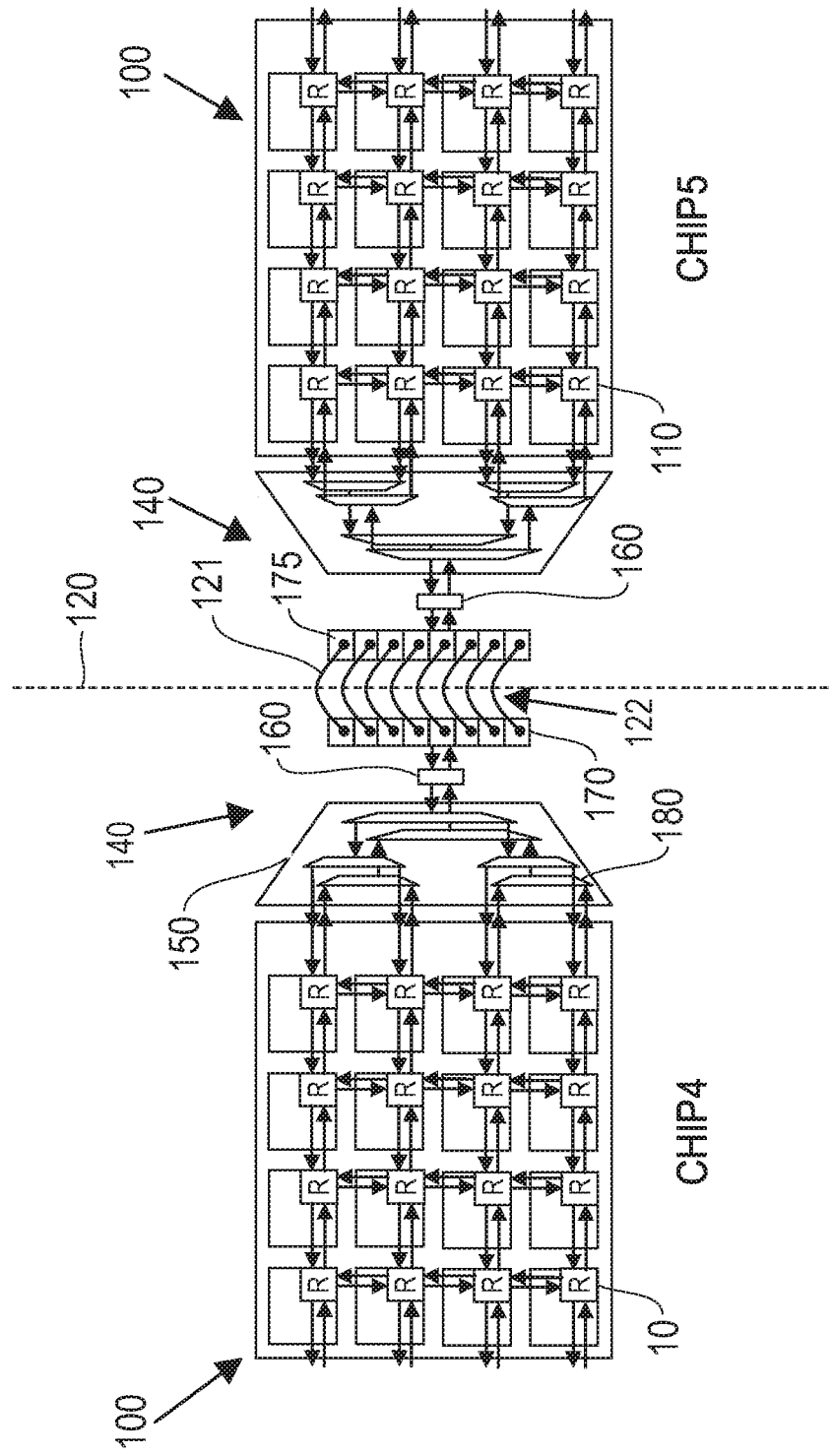
FIG. 9 illustrates an example configuration for enabling communication between two chip circuits, in accordance with an embodiment of the invention.

FIG. 9 illustrates an example configuration for enabling communication between two chip circuits 100, in accordance with an embodiment of the invention. Serialize and de-serialize devices 160 are utilized at a peripheral/boundary interface 120 between a first chip circuit 100 and a second chip circuit 100 (e.g., CHIP4 and CHIP5 of the on-board system 115) to link the two chip circuits 100. The serialize and de-serialize device 160 for the first chip circuit 100 is configured to serialize outgoing data (i.e., off-chip communications) from the first chip circuit 100, and de-serialize incoming data for the first chip circuit 100 from other chip circuits 100 (e.g., the second chip circuit 100). The serialize and de-serialize device 160 for the second chip circuit 100 is configured to serialize outgoing data (i.e., off-chip communications) from the second chip circuit 100, and de-serialize incoming data for the second chip circuit 100 from other chip circuits 100 (e.g., the first chip circuit 100). An interconnect fabric 122 comprising multiple chip-to-chip connects 121 interconnects the I/O pads 175 of the first chip circuit 100 with the I/O pads 175 of the second chip circuit 100.

Figure 10:
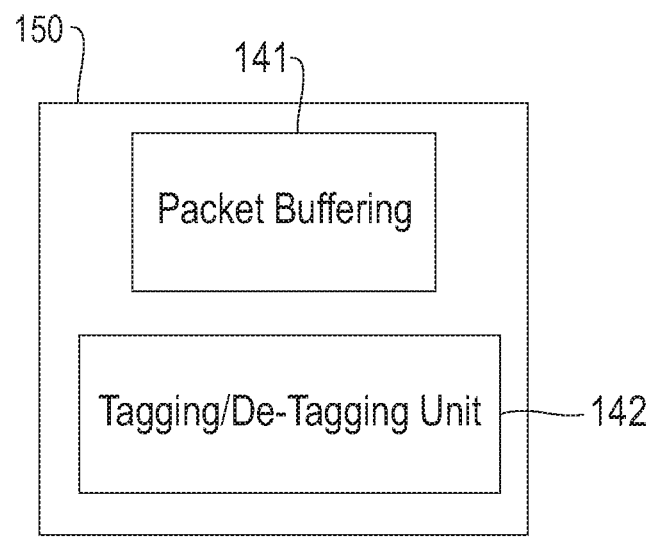
FIG. 10 illustrates example application modules of a funnel device for a chip circuit, in accordance with an embodiment of the invention.

FIG. 10 illustrates example application modules of a funnel device 150 for a chip circuit 100, in accordance with an embodiment of the invention. In one embodiment, each funnel device 150 has a corresponding packet buffering module 141 and a corresponding tagging/de-tagging module 142.

The packet buffering module 141 is configured to buffer packets (e.g., buffer packets in a First In, First Out (FIFO) fashion).

The tagging/de-tagging module 142 is configured to tag each outgoing packet from the funnel device 150 with tag information identifying the location of a source core circuit 10 of the chip circuit 100 that generated the outgoing packet (e.g., the row/column of the source core circuit 10 on the chip circuit 100). Each tagged outgoing packet is routed to an input/output (I/O) pad 175 of the chip circuit 100 for delivery to another chip circuit 100.

For each incoming packet from an I/O pad 175 of the chip circuit 100, tag information identifying a location of a core circuit 10 on the chip circuit 100 that the incoming packet targets (e.g., the row/column of the target core circuit 10 on the chip circuit 100) is removed. Each incoming packet is routed to a target core circuit 10 on the chip circuit 100 based on tag information for the incoming packet.

Figure 11:
FIG. 11 illustrates an example address event packet routed east-west between two chip circuits, in accordance with an embodiment of the invention.

FIG. 11 illustrates an example address event packet 420 routed east-west between two chip circuits 100, in accordance with an embodiment of the invention. The funnel device 150 for a chip circuit 100 tags each outgoing address event packet from the chip circuit 100 with tag information identifying the location of a source core circuit 10 of the chip circuit 100 that generated the outgoing packet (e.g., the row/column of the source core circuit 10 on the chip circuit 100). Specifically, the funnel device 150 tags each address event packet 400 routed east-west within the chip circuit 100 with a row field R, thereby forming the address event packet 420 shown in FIG. 11.

In one embodiment, the row field R maintains 5 bits of data. The row field R identifies a destination row of the two-dimensional array 112 of the target chip circuit 100 that a funnel device 150 should route/steer the packet to. For example, if the two-dimensional array 112 is 32×32 array, the range of possible values for the row field R is 0 to 31.

In one embodiment, data paths 111 between a funnel device 150 and a corresponding serialize and de-serialize device 160 for east-west routing include 77 incoming data paths 111 and 77 reciprocal outgoing data paths 111, wherein address-event packets routed east-west between the funnel device 150 and the serialize and de-serialize device 160 are encoded as 19 1in4 groups with a shared enable. Data paths 111 between a funnel device 150 and a corresponding serialize and de-serialize device 160 for north-south routing include 57 incoming data paths 111 and 57 reciprocal outgoing data paths 111, wherein address-event packets routed north-south between the funnel device 150 and the serialize and de-serialize device 160 are encoded as 14 1 in4 groups with a shared enable.

Figure 12:
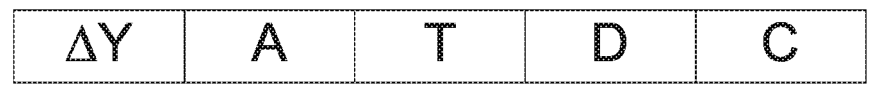
FIG. 12 illustrates an example address event packet routed north-south between two chip circuits, in accordance with an embodiment of the invention.

In one embodiment, data paths 111 between a serialize and de-serialize device 160 and a corresponding set 170 of I/O pads for east-west routing include 39 incoming data paths 111 and 39 reciprocal outgoing data paths 111, wherein address-event packets routed east-west between the serialize and de-serialize device 160 and the set 170 of I/O pads are serialized to 10 1 in4 groups. Data paths 111 between a serialize and de-serialize device 160 and a corresponding set 170 of I/O pads for north-south routing include 29 incoming data paths 111 and 29 reciprocal outgoing data paths 111, wherein address-event packets routed north-south between the serialize and de-serialize device 160 and the set 170 of I/O pads are serialized to 7 1 in4 groups FIG. 12 illustrates an example address event packet 430 routed north-south between two chip circuits 100, in accordance with an embodiment of the invention. The funnel device 150 for a chip circuit 100 tags each outgoing address event packet from the chip circuit 100 with tag information identifying the location of a source core circuit 10 of the chip circuit 100 that generated the outgoing packet (e.g., the row/column of the source core circuit 10 on the chip circuit 100). Specifically, the funnel device 150 tags each address event packet 410 routed north-south within the chip circuit 100 with a column field C, thereby forming the address event packet 430 shown in FIG. 12.

In one embodiment, the column field C maintains 5 bits of data. The column field C identifies a destination column of the two-dimensional array 112 of the target chip circuit 100 that a funnel device 150 should route/steer the packet to. For example, if the two-dimensional array 112 is 32×32 array, the range of possible values for the column field C is 0 to 31.

Figure 13:
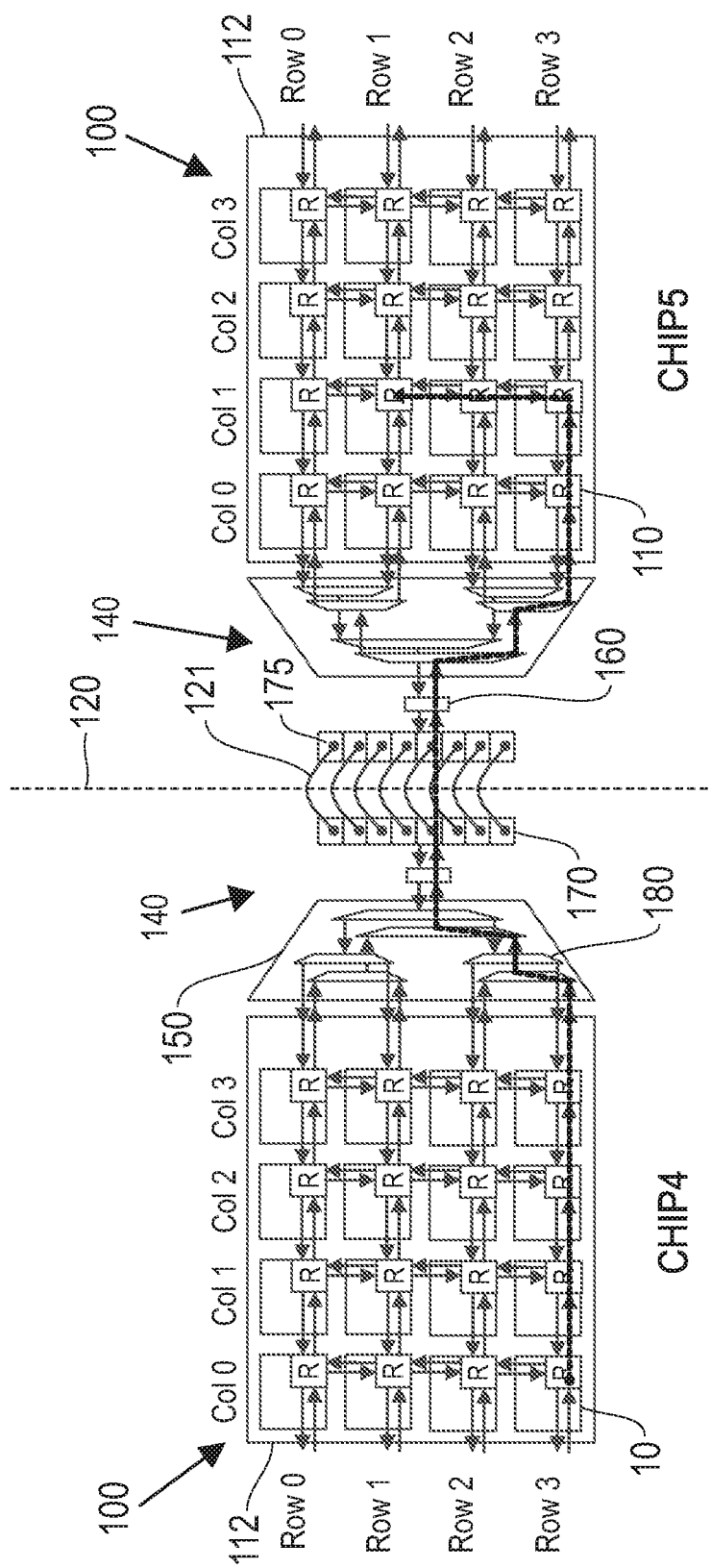
FIG. 13 illustrates an example routing of an address event packet between two chip circuits, in accordance with an embodiment of the invention.

FIG. 13 illustrates an example routing of an address event packet between two chip circuits 100, in accordance with an embodiment of the invention. For example, a neuron 11 of a core circuit (3,0) of the first chip circuit 100 (e.g., CHIP4) may generate a firing event targeting an axon 15 of a core circuit (1,1) of the second chip circuit 100 (e.g., CHIP5). To reach the core circuit (1,1) of the second chip circuit 100, an address event packet for the firing event first is generated, including a horizontal distance field $\Delta X$ equal to 5 and a vertical distance field $\Delta Y$ equal to −2. The address event packet propagates from the packet router 110 for the core circuit (3,0) to a funnel device 150 corresponding to the first chip circuit 100 via the packet routers 110 for the cores circuits (3,1), (3,2) and (3,3) of the chip circuit 100 in the eastbound direction. As shown in FIG. 13, the address event packet exits the two-dimensional array 112 of the first chip circuit 100 at row 3. The funnel device 150 corresponding to the first chip circuit 100 tags the address-event packet with a row field R including the value 3 (i.e., representing row 3), and sends the tagged address-event packet to the serialize and de-serialize device 160 and then to an I/O pad 175 for delivery to the second chip circuit 100.

An I/O pad 175 of the second chip circuit 100 receives the address event packet from the first chip circuit 100 via a chip-to-chip connect 121. The serialize and de-serialize device 160 de-serializes the address event packet. A funnel device 150 corresponding to the second chip circuit 100 removes the corresponding tag, and routes the address event packet to row 3 of the two-dimensional array 112 of the second chip circuit 100 based on the tag. The address event packet enters the two-dimensional array 112 of the second chip circuit 100 at row 3, and propagates in the eastbound direction via the packet routers 110 for the cores circuits (3,0) and (3,1) of the second chip circuit 100. When the address event packet reaches the packet router 110 for the core circuit (3,1) of the second chip circuit 100, the address event packet has horizontally traversed six core circuits 10 in total (i.e., four core circuits 10 in the first chip circuit 100 and two core circuits 10 in the second chip circuit 100), as specified by the horizontal distance field $\Delta X$. The horizontal distance field $\Delta X$ is dropped from the address event packet, and the address event packet propagates in the northbound direction towards the core circuit (1,1) of the second chip circuit 100 via the packet routers 110 for the core circuits (2,1) and (1,1) of the second chip circuit 100. When the address event packet reaches the core circuit (1,1) of the second chip circuit 100, the address event packet has vertically traversed two core circuits 10 in total (i.e., two core circuits in the second chip circuit 100), as specified by the vertical distance field $\Delta Y$.

Figure 14:
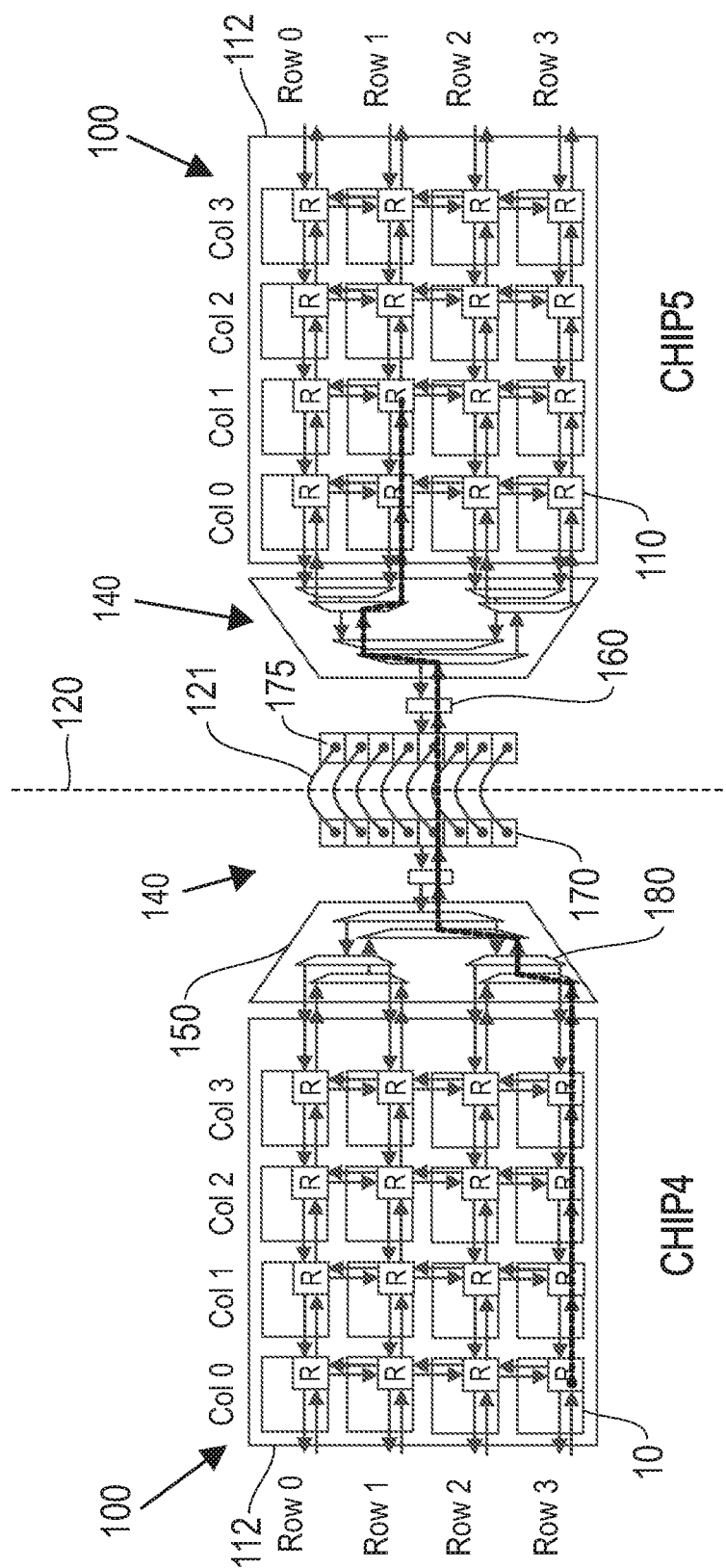
FIG. 14 illustrates another example routing of an address event packet between two chip circuits, in accordance with an embodiment of the invention.

FIG. 14 illustrates another example routing of an address event packet between two chip circuits 100, in accordance with an embodiment of the invention. In one embodiment, each funnel device 150 is configured to direct an incoming address event packet a row/column closer to a target core circuit 10, thereby minimizing travel length and increasing routing efficiency. For example, instead of steering the address event packet to row 3 of the two-dimensional array 112 of the second chip circuit 100, the funnel device 150 corresponding to the second chip circuit 100 determines which row is closer to the target core circuit (1,1) based on the vertical distance field $\Delta Y$ and the row field R. Specifically, the funnel device 150 corresponding to the second chip circuit 100 adds the vertical distance field $\Delta Y$ and the row field R. As the vertical distance field $\Delta Y$ is equal to −2 and the row field R is equal to 3, the result of adding the vertical distance field $\Delta Y$ and the row field R is 1. The funnel device 150 steers the address event packet to row 1 of the two-dimensional array 112 of the second chip circuit 100. The address event packet enters the two-dimensional array 112 of the second chip circuit 100 at row 1, and propagates in the eastbound direction via the packet routers 110 for the cores circuits (1,0) and (1,1) of the second chip circuit 100 to reach the core circuit (1,1). The amount of horizontal distance traversed is the same as in FIG. 13 (i.e., 6 core circuits in total). The amount of vertical distance traversed, however, is different than in FIG. 13 (i.e., 0 core circuits in total).

Figure 15:
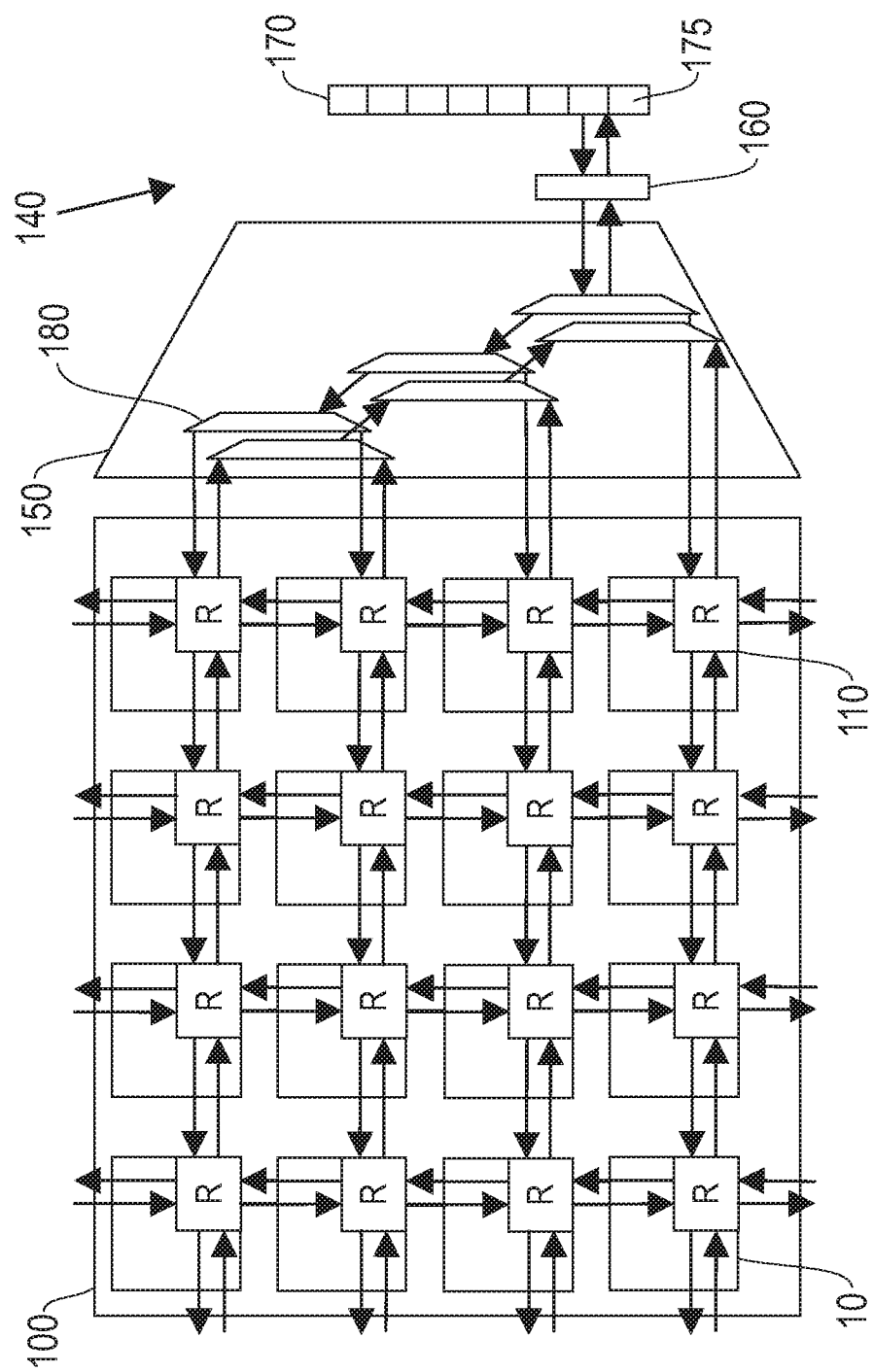
FIG. 15 illustrates an example funnel device including multiple funnel units arranged in a binary chain, in accordance with an embodiment of the invention.
Figure 16:
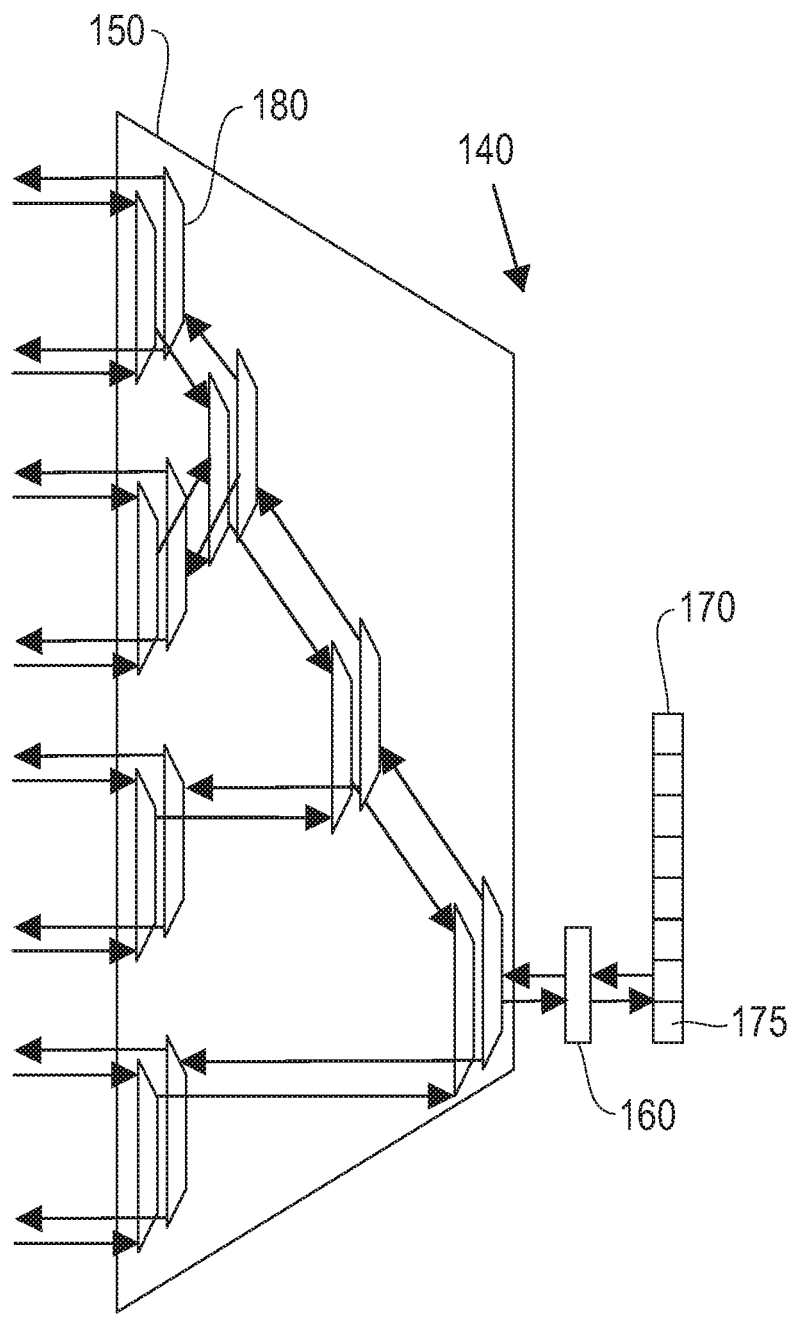
FIG. 16 illustrates an example funnel device including multiple funnel units arranged in a combination of a binary tree and a binary chain, in accordance with an embodiment of the invention.

As stated above, the funnel units 180 of each funnel device 150 may be arranged in different configurations, such as binary tree, a binary chain, or a combination of a binary tree and a binary chain. FIG. 15 illustrates an example funnel device 150 including multiple funnel units 180 arranged in a binary chain, in accordance with an embodiment of the invention. As shown in FIG. 15, the funnel units 180 form a chain funnel. FIG. 16 illustrates an example funnel device 150 including multiple funnel units 180 arranged in a combination of a binary tree and a binary chain, in accordance with an embodiment of the invention. As shown in FIG. 16, the funnel units 180 form a hybrid tree-chain funnel. In one embodiment, a chain funnel is formed after a tree funnel is formed. In another embodiment, a tree funnel is formed after a chain funnel is formed.

Figure 17:
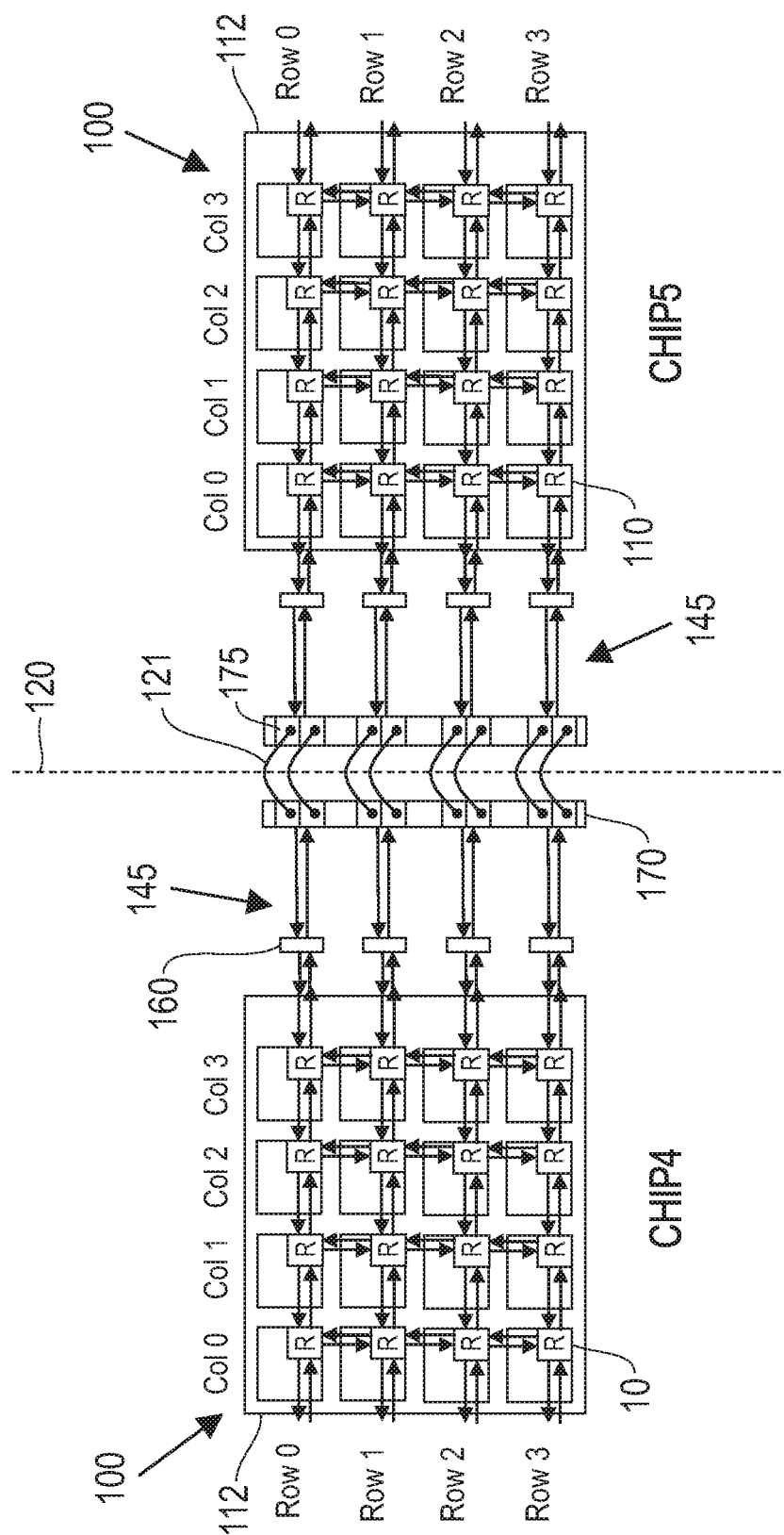
FIG. 17 illustrates another example network interface, in accordance with an embodiment of the invention.

FIG. 17 illustrates another example network interface 145, in accordance with an embodiment of the invention. The network interface 145 comprises multiple serialize and de-serialize devices 160. Specifically, each row of the two dimensional array 112 of each chip circuit 100 has at least one corresponding serialize and de-serialize device 160 for serializing outgoing data in the eastbound direction and de-serializing incoming data from the eastbound direction, and at least one corresponding serialize and de-serialize device 160 for serializing outgoing data in the westbound direction and de-serializing incoming data from the westbound direction. Each column of the two dimensional array 112 of each chip circuit 100 has at least one corresponding serialize and de-serialize device 160 for serializing outgoing data in the northbound direction and de-serializing incoming data from the northbound direction, and at least one corresponding serialize and de-serialize device 160 for serializing outgoing data in the southbound direction and de-serializing incoming data from the southbound direction.

In one embodiment, each serialize and de-serialize device 160 serializes address-event packets from N bits to M bits from a corresponding row/column, wherein N>M. For example, a 32-bit address event packet may be serialized into 1 signal line that sequentially transmits all 32 bits. Each serialize and de-serialize device 160 has at least one corresponding I/O pad 175 for sending outgoing data, and at least one corresponding I/O pad 175 for receiving incoming data. The serialized packet is tagged with a row field R/column field C, and routed to an input/output (I/O) pad 175 for delivery to another chip circuit 100.

Each serialize and de-serialize device 160 de-serializes each serialized packet received from at least one corresponding I/O pad 175, and steers the de-serialized packet to a corresponding row/column (i.e., the same row/column as the row/column of the source core circuit 10 on the source chip circuit 100).

Figure 18:
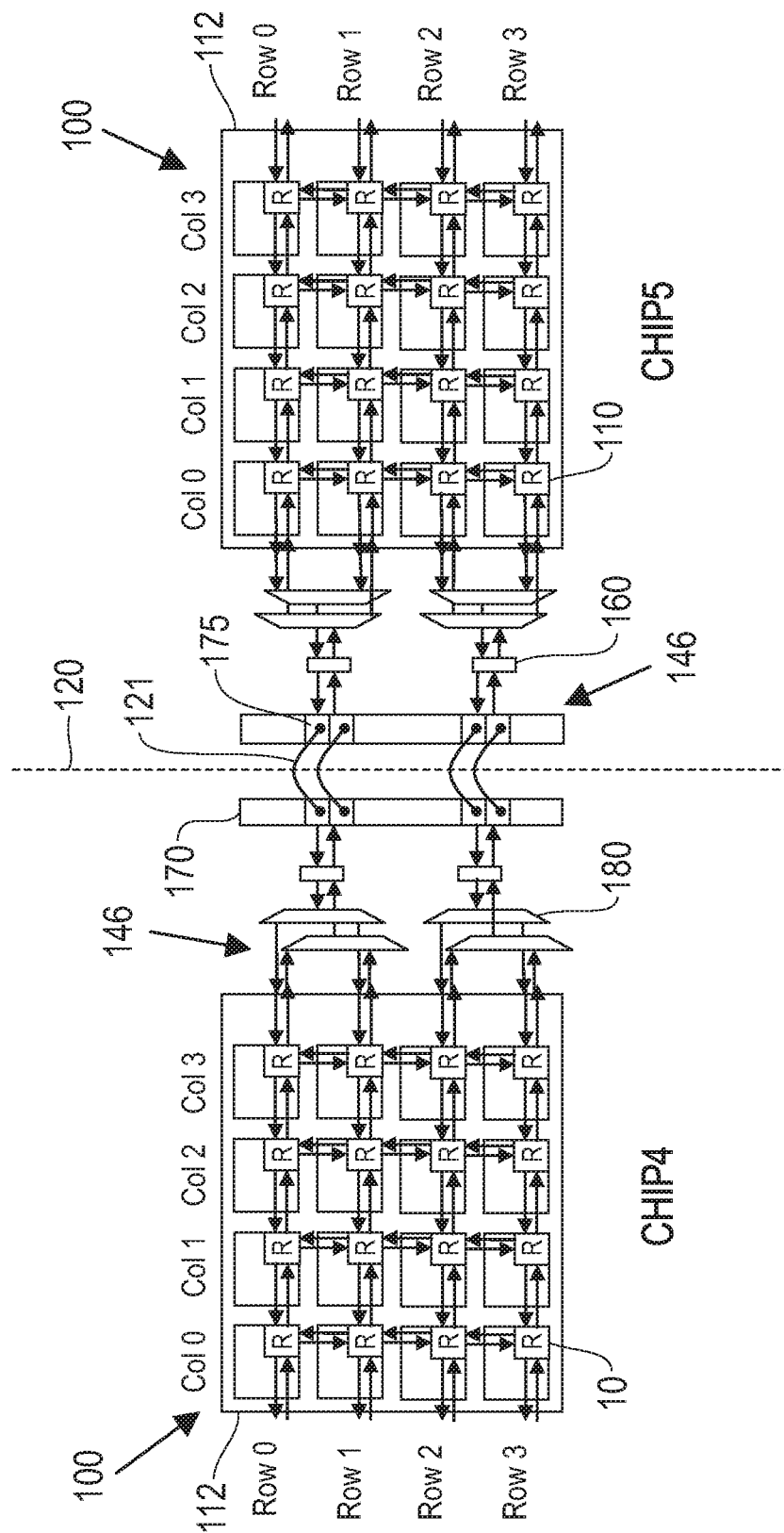
FIG. 18 illustrates another example network interface, in accordance with an embodiment of the invention.

FIG. 18 illustrates another example network interface 146, in accordance with an embodiment of the invention. The network interface 146 comprises multiple funnels units 180. Each funnel unit 180 corresponds to two or more rows/columns of the two dimensional array 112 of a chip circuit 100.

Figure 19:
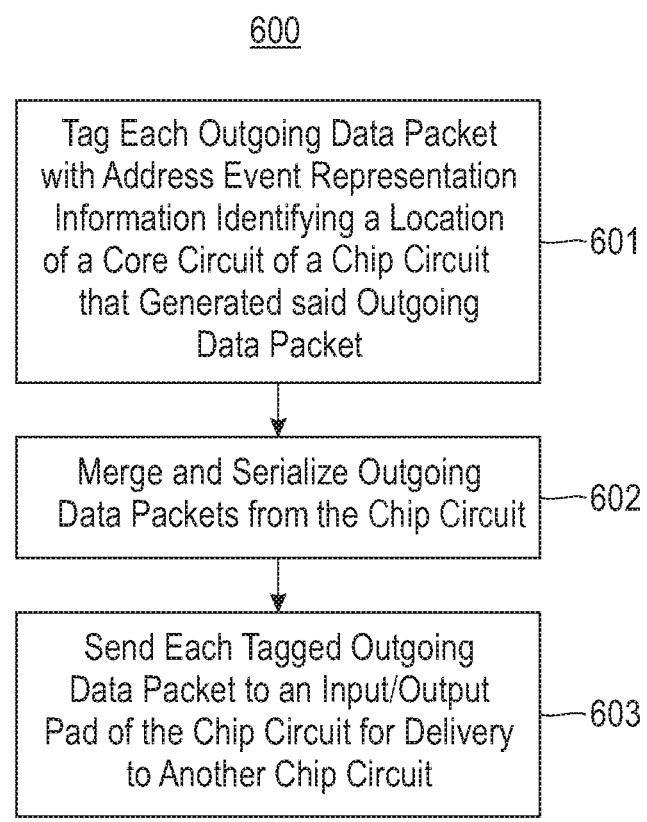
FIG. 19 illustrates a flowchart of an example process for routing outgoing data generated by a chip structure, in accordance with an embodiment of the invention.

FIG. 19 illustrates a flowchart of an example process 600 for routing outgoing data generated by a chip circuit, in accordance with an embodiment of the invention. In process block 601, tag each outgoing data packet with address event representation information identifying a location of a core circuit of a chip circuit that generated the outgoing data packet. In process block 602, merge and serialize outgoing data packets from the chip circuit. In process block 603, send each tagged outgoing data packet to an input/output (I/O) pad of the chip circuit for delivery to another chip circuit.

Figure 20:
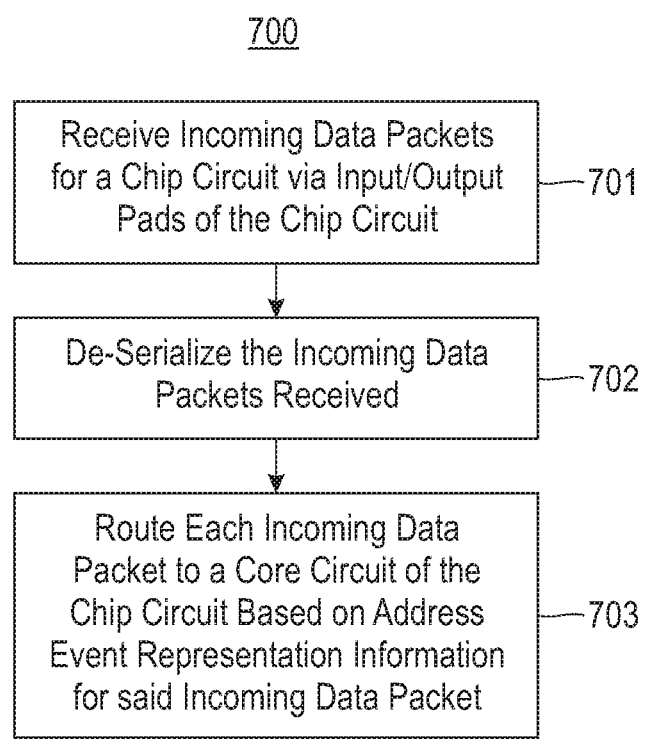
FIG. 20 illustrates a flowchart of an example process for routing incoming data for a chip circuit, in accordance with an embodiment of the invention.

FIG. 20 illustrates a flowchart of an example process 700 for routing incoming data for a chip circuit, in accordance with an embodiment of the invention. In process block 701, receive incoming data packets for a chip circuit via input/output (I/O) pads of the chip circuit. In process block 702, de-serialize the incoming data packets received. In process block 703, route each incoming data packet to a core circuit of the chip circuit based on address event representation for said incoming data packet.

Figure 21:
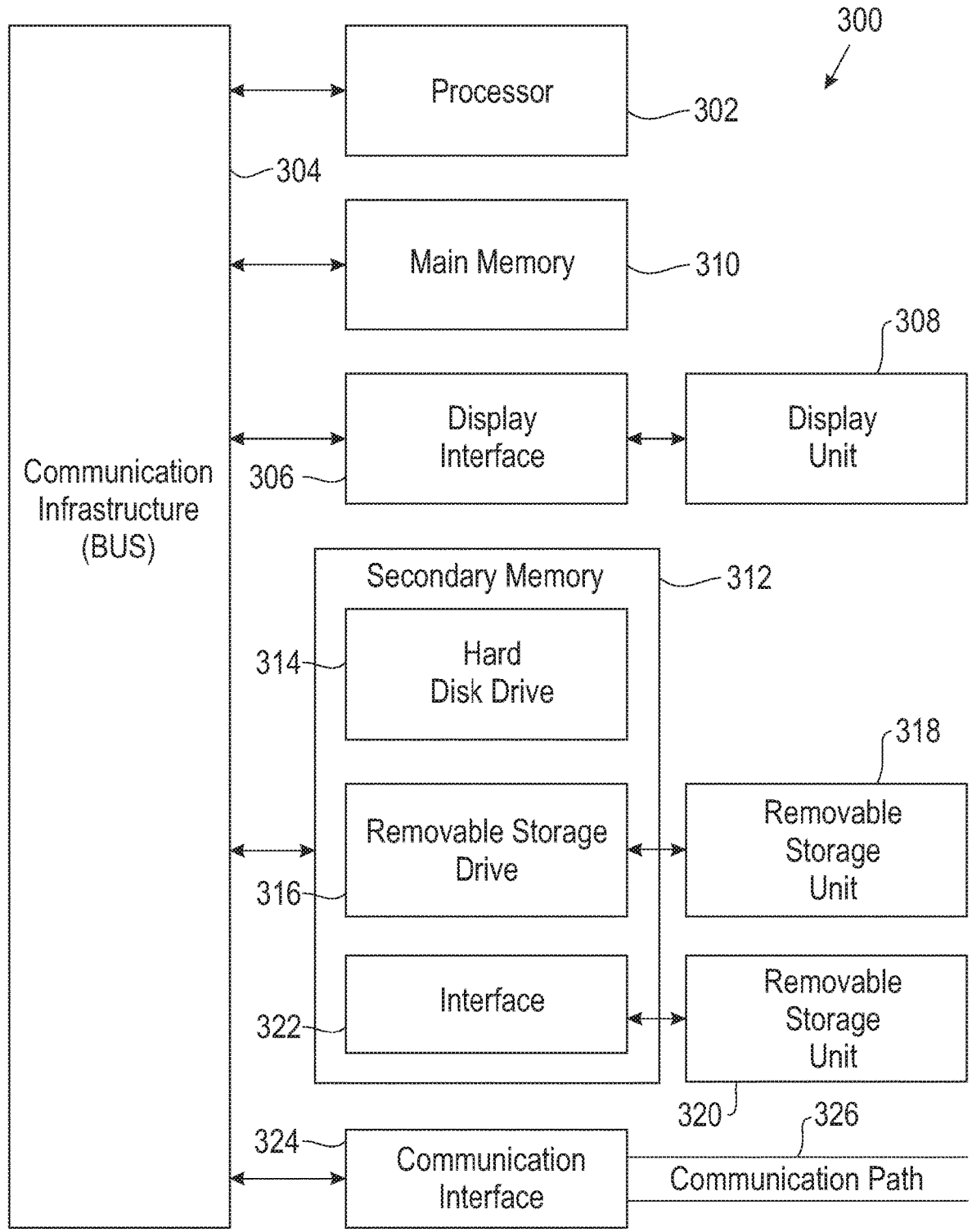
FIG. 21 is a high level block diagram showing an information processing system useful for implementing one embodiment of the present invention.

FIG. 21 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   multiple neurosynaptic network circuits, wherein each neurosynaptic network circuit comprises a plurality of neurosynaptic core circuits; and
   for each neurosynaptic network circuit, a corresponding network interface, wherein said corresponding network interface reduces travel length and increases efficiency of routing an event packet to a target neurosynaptic core circuit of said neurosynaptic network circuit based on a location of said target neurosynaptic core circuit within said neurosynaptic network circuit, and each network interface corresponding to each neurosynaptic network circuit comprises at least one funnel device.

2. The system of claim 1, wherein each neurosynaptic core circuit comprises multiple electronic neurons, multiple electronic axons, and a plurality of electronic synapse devices interconnecting said multiple neurons with said multiple axons.

3. The system of claim 1, wherein neurosynaptic core circuits of each neurosynaptic network circuit are arranged as an array including multiple rows and multiple columns.

4. The system of claim 3, wherein each network interface corresponding to each neurosynaptic network circuit:
   receives an event packet targeting a neurosynaptic core circuit of said neurosynaptic network circuit;
   determines a row of an array of said neurosynaptic core circuit that is closest to said target neurosynaptic core circuit based on routing information included in said event packet; and
   steers said event packet to the row determined.

5. The system of claim 4, wherein each event packet comprises the following routing information:
   a first distance indicative of a number of neurosynaptic core circuits that said event packet traverses vertically within a neurosynaptic network circuit comprising a target neurosynaptic core circuit for said event packet; and
   a row number indicative of which row of an array of said neurosynaptic network circuit that said target neurosynaptic core circuit is located at.

6. The system of claim 4, wherein each event packet comprises the following routing information:
   a first distance indicative of a number of neurosynaptic core circuits that said event packet traverses vertically within a neurosynaptic network circuit comprising a target neurosynaptic core circuit for said event packet; and
   a column number indicative of which column of an array of said neurosynaptic network circuit that said target neurosynaptic core circuit is located at.

7. A method comprising:
   generating event packets via multiple neurosynaptic network circuits, wherein each neurosynaptic network circuit comprises a plurality of neurosynaptic core circuits; and routing said event packets between said multiple neurosynaptic network circuits;
   wherein each neurosynaptic network circuit has a corresponding network interface reduces travel length and increases efficiency of routing an event packet to a target neurosynaptic core circuit of said neurosynaptic network circuit based on a location of said target neurosynaptic core circuit within said neurosynaptic network circuit, and each network interface corresponding to each neurosynaptic network circuit comprises at least one funnel device.

8. The method of claim 7, wherein each neurosynaptic core circuit comprises multiple electronic neurons, multiple electronic axons, and a plurality of electronic synapse devices interconnecting said multiple neurons with said multiple axons.

9. The method of claim 7, wherein neurosynaptic core circuits of each neurosynaptic network circuit are arranged as an array including multiple rows and multiple columns.

10. The method of claim 9, wherein each network interface corresponding to each neurosynaptic network circuit:
- receives an event packet targeting a neurosynaptic core circuit of said neurosynaptic network circuit;
- determines a row of the array of said neurosynaptic core circuit that is closest to said target neurosynaptic core circuit based on routing information included in said event packet; and
- steers said event packet to the row determined.

11. The method of claim 10, wherein each event packet comprises the following routing information:
- a first distance indicative of a number of neurosynaptic core circuits that said event packet traverses vertically within a neurosynaptic network circuit comprising a target neurosynaptic core circuit for said event packet; and
- a row number indicative of which row of the array of said neurosynaptic network circuit that said target neurosynaptic core circuit is located at.

12. The method of claim 10, wherein each event packet comprises the following routing information:
- a first distance indicative of a number of neurosynaptic core circuits that said event packet traverses vertically within a neurosynaptic network circuit comprising a target neurosynaptic core circuit for said event packet; and
- a column number indicative of which column of an array of said neurosynaptic network circuit that said target neurosynaptic core circuit is located at.

13. A computer program product for scaling multi-core neurosynaptic networks, the computer program product comprising a non-transitory computer-readable storage medium having program code embodied therewith, the program code being executable by a computer to:
- generating event packets via multiple neurosynaptic network circuits, wherein each neurosynaptic network circuit comprises a plurality of neurosynaptic core circuits; and routing said event packets between said multiple neurosynaptic network circuits;
- wherein each neurosynaptic network circuit has a corresponding network interface reduces travel length and increases efficiency of routing an event packet to a target neurosynaptic core circuit of said neurosynaptic network circuit based on a location of said target neurosynaptic core circuit within said neurosynaptic network circuit, and each network interface corresponding to each neurosynaptic network circuit comprises at least one funnel device.

14. The computer program product of claim 13, wherein each neurosynaptic core circuit comprises multiple electronic neurons, multiple electronic axons, and a plurality of electronic synapse devices interconnecting said multiple neurons with said multiple axons.

15. The computer program product of claim 13, wherein neurosynaptic core circuits of each neurosynaptic network circuit are arranged as an array including multiple rows and multiple columns.

16. The computer program product of claim 15, wherein each network interface corresponding to each neurosynaptic network circuit:
- receives an event packet targeting a neurosynaptic core circuit of said neurosynaptic network circuit;
- determines a row of the array of said neurosynaptic core circuit that is closest to said target neurosynaptic core circuit based on routing information included in said event packet; and
- steers said event packet to the row determined.

17. The computer program product of claim 16, wherein each event packet comprises the following routing information:
- a first distance indicative of a number of neurosynaptic core circuits that said event packet traverses vertically within a neurosynaptic network circuit comprising a target neurosynaptic core circuit for said event packet; and
- a row number indicative of which row of the array of said neurosynaptic network circuit that said target neurosynaptic core circuit is located at.

18. The computer program product of claim 16, wherein each event packet comprises the following routing information:
- a first distance indicative of a number of neurosynaptic core circuits that said event packet traverses vertically within a neurosynaptic network circuit comprising a target neurosynaptic core circuit for said event packet; and
- a column number indicative of which column of the array of said neurosynaptic network circuit that said target neurosynaptic core circuit is located at.

* * * * *